United States Patent Office 3,733,356
Patented May 15, 1973

3,733,356
PROCESS FOR THE PREPARATION OF CIS-1-PROPENYLPHOSPHONIC ACID
Edward J. Glamkowski, Plainfield, Carlos B. Rosas, Rahway, Meyer Sletzinger, North Plainfield, and Joseph A. Wantuck, Woodbridge, N.J., assignors to Merck & Co., Rahway, N.J.
No Drawing. Filed Dec. 29, 1969, Ser. No. 888,864
Int. Cl. C07f 9/38, 9/42
U.S. Cl. 260—543 P    3 Claims

ABSTRACT OF THE DISCLOSURE

Cis-1-propenylphosphonic acid is prepared by reacting propargyl alcohol with an excess of phosphorus trichloride at elevated temperature to form 2-propynylphosphorodichloridite which is thermally rearranged to propadienylphosphonic dichloride. The latter compound is catalytically hydrogenated and then hydrolyzed to cis-1-propenylphosphonic acid, which is useful in preparing antibacterial materials.

DESCRIPTION OF THE INVENTION

This invention relates to a novel method for preparing cis-1-propenylphosphonic acid. The process employs as starting material propargyl alcohol and phosphorus trichloride and involves formation of 2-propynylphosphorodichloroidite, rearrangement of this material to propadienylphosphonic dichloride, catalytic hydrogenation and finally hydrolysis to the free phosphonic acid.

An object of this invention is to provide a novel process for preparing cis-1-propenylphosphonic acid from known starting materials. Another object is to provide a method for preparing propadienylphosphonic dichloride in high yield and purity. A further object is to prepare propadienylphosphonic dichloride by a continuous process. Another object is to provide a process whereby the desired propadienylphosphonic dichloride and propenylphosphonic acid are obtained in high yield and purity, and by a method which does not require the isolation and purification of intermediate products. Further objects will be evident from the following description of the invention.

In accordance with the present invention, cis-1-propenylphosphonic acid is prepared by the reaction of propargyl alcohol with phosphorus trichloride to initially form the acetylenic phosphorus intermediate, 2-propynylphosphorodichloridite, which is then rearranged to propadienylphosphonic dichloride. The latter compound is catalytically reduced to cis-1-propenylphosphonic dichloride and this last compound subsequently hydrolyzed to cis-1-propenylphosphonic acid.

In an alternate embodiment of the process, the propadienylphosphonic dichloride is first hydrolyzed to the phosphonic acid derivative and the acid is selectively reduced under aqueous basic conditions to afford cis-1-propenylphosphonic acid.

The cis-1-propenylphosphonic acid obtained in accordance with the process of this invention is useful in making ($\pm$) and (−) (cis-1,2-epoxypropyl)phosphonic acid, esters and salts thereof, which have antibacterial activity as described in Belgian Pat. No. 723,072.

In the first step of the novel process of this invention, propargyl alcohol is reacted with phosphorus trichloride to initially form an acetylenic trivalent phosphorus intermediate, 2-propynylphosphorodichloridite (I).

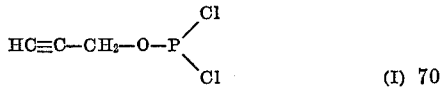

(I)

In order to afford a high yield of the desired phosphite (I) and to minimize the formation of by-product, namely di-2-propynylphosphorochloridite, it is essential that certain reaction conditions be controlled. One essential condition in this step of the process is the ratio of phosphorus trichloride to propargyl alcohol employed in forming 2-propynyl phosphorodichloridite (I). From about 1.5–30 or more moles of phosphorus trichloride are necessary per mole of propargyl alcohol to produce a high yield of phosphite intermediate (I) and to minimize the formation of by-product. It has been found that as higher equivalents of phosphorus trichloride to propargyl alcohol are employed, the ratio of 2-propynyl phosphorodichloridite to by-product also increases. When higher equivalents of phosphorus trichloride are employed, for example 10–30 moles per mole of propargyl alcohol, no solvent is necessary since the phosphorus trichloride serves as a solvent as well as a reactant. However, when lower equivalents of phosphorus trichloride are employed, for example from 1.5–10 moles of phosphorus trichloride per mole of propargyl alcohol, a solvent may be necessary in the practice of this invention. Solvents which are of particular value in this process are inert hydrocarbon solvents such as benzene, toluene, xylene, cyclohexane, and the like.

Another important condition in the process of this invention is the temperature at which the 2-propynyl phosphorodichloridite is formed. The temperature of addition and reaction to form the phosphite intermediate (I) is from 60° C. to 110° C.; addition of propargyl alcohol at lower temperatures increases the amount of by-product formation and subsequently results in a lower yield of the desired phosphite (I) compound. When the reaction is carried out using phosphorus trichloride as reagent and reaction medium, the addition of propargyl alcohol can be carried out between 60° C. and the boiling point of phosphorus trichloride; however, the addition is preferably carried out slightly below the boiling point of phosphorus trichloride. When a solvent is utilized, the temperature at which the propargyl alcohol is added and reacted is determined by the nature of the solvent employed. The propargyl alcohol can be added at an elevated temperature up to the boiling point of the solvent, however, it is preferable to add the alcohol at a temperature below the boiling point of the solvent. For example, when toluene is employed as the solvent, it is preferable to conduct the reaction between 85° C.–100° C. and when xylene is employed as the solvent, the addition is preferably carried out between 85° C.–110° C.

It is preferred for best results that the addition of propargyl alcohol be carried out as rapidly as possible and with vigorous stirring to minimize the formation of diphosphite by-product. The reaction mixture is preferably protected from moisture and oxidation by conducting the reaction in an inert atmosphere such as nitrogen.

The formation of the 2-propynylphosphorodichloridite (I) intermediate is accompanied by the generation of hydrogen chloride gas. One method previously used for removing hydrogen chloride is to employ an acid acceptor, for example an organic amine, which removes the gas from the reaction medium by precipitating out as the hydrochloride salt; this method requires removal by filtration or some other separation technique. In the present invention, since the formation of the phosphite (I) is accomplished at elevated temperature, the hydrogen chloride gas that is generated is removed from the reaction medium, for example by distillation, as it is formed. Using the essential conditions of the present invention, namely excess phosphorus trichloride, rapid addition at elevated temperature, and absence of an acid acceptor, it is possible to prepare the intermediate, 2-propynylphosphorodichloridite, in sufficiently high yield and purity to conduct the subsequent rearrangement to propadienylphosphonic dichloride without purification or isolation. Furthermore, since the phosphite intermediate (I) is an explosive material, the novel process of this invention prevents large amounts of the phosphite from accumulating and eliminates the necessity of a potentially dangerous distillation.

It has been found that 2-propynylphosphorodichloridite rearranges readily and rapidly at elevated temperatures to the allenic compound, that is propadienylphosphonic dichloride (II) represented by the structural formula

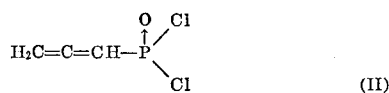

(II)

The rearrangement reaction is carried out by heating the 2-propynylphosphorodichloridite (I) at elevated temperature for about 1–5 hours. Since the conditions for effecting the first step of our process include addition of the propargyl alcohol at elevated temperature, the rearrangement is conveniently carried out by maintaining the temperature at which the propargyl alcohol was added or by increasing the temperature of the reaction to reflux. When the formation of 2-propynylphosphorodichloridite is run in a large excess of phosphorus trichloride in the absence of an organic solvent, the rearrangement of the phosphite intermediate (I) occurs rapidly at the reflux temperature of phosphorus trichloride and affords essentially a quantitative conversion to propadienylphosphonic dichloride (II). When an inert organic solvent is employed, the rearrangement reaction is carried out by heating the phosphite intermediate (I) between 85–110° C. The yield of propadienyl material (II) is approximately 85–90% based on starting propargyl alcohol. Analysis by NMR indicates that the reaction product consists of a mixture of from 90 to 94% of propadienylphosphonic dichloride and about 6 to 10% of 2-propynyl propadienylphosphonochloridate. From the standpoint of isolation or recovery, the propadiene (II) is the first recoverable product when the optimum conditions of elevated temperature and absence of base are utilized.

The propadienylphosphonic dichloride (II) may be isolated if desired but this is not necessary and is not preferred because that material is formed in sufficiently pure state to permit its use directly without purification in the next step of the process.

It is also within the scope of this invention to prepare propadienylphosphonic dichloride from propargyl alcohol and phosphorus trichloride by means of a continuous process rather than a step-wise process. In this approach, the formation of the phosphite intermediate (I) and its rearrangement is carried out simultaneously to afford the phosphonic dichloride (II). This reaction can be carried out in any reactor which allows intimate mixing of reagents under vigorous stirring conditions; for example a continuous stirred tank reactor.

The continuous process is particularly well adapted for reacting low molar ratios of phosphorus trichloride to propargyl alcohol, for example, 3 to 10:1, at higher temperature in the presence of an inert hydrocarbon solvent such as benzene, toluene, xylene, cyclohexane, and the like. The reaction is carried out by continuously adding the reagents to the inert solvent at a temperature of from 85°–110° C. at a rate such that the residence time for the reaction is from 0.25 to 3 hours and preferably from 0.5 to 1.5 hours. As the propadienylphosphonic dichloride is formed, it is continuously removed from the reaction, and the solvent and phosphorus trichloride removed by techniques known in the art to afford the desired product.

By running the reaction on a continuous basis with a low molar ratio of reactants in an inert solvent to obtain higher temperatures, the thermal rearrangement reaction of the trivalent phosphite intermediate (I), namely 2-propynylphosphorodichloridite, to pentavalent propadienylphosphonic dichloride (II) competes with the reaction of the phosphite intermediate (I) with a second mole of propargyl alcohol which results in the by-product, di-2-propynylphosphorochloridite. When the reaction is carried out at temperatures exceeding the desired range, the propadienylphosphonic dichloride (II) can then react with a second mole of propargyl alcohol thus reducing the yield of the propadienylphosphonic dichloride (II).

In the next step of the preferred embodiment of this invention, propadienylphosphonic dichloride (II) is hydrogenated, preferably catalytically, in order to obtain cis-1-propenylphosphonic dichloride (III).

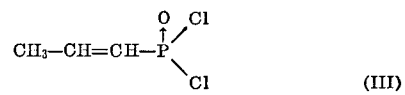

(III)

Catalytic hydrogenation is preferred since this method yields only the cis-olefin in good yield. When other reduction techniques are employed, a mixture of cis- and trans- isomers may be obtained, which must be further separated in order to obtain the pure cis-olefin.

The catalytic reduction is brought about by hydrogenation in the presence of an appropriate catalyst. Catalysts especially useful in the hydrogenation are homogeneous catalysts, for example Wilkinson catalysts, tri(triphenyl phosphine) rhodium (I) chloride, and heterogeneous catalysts, for example noble metals or Raney nickel. The preferred catalyst is palladium or Raney nickel on a suitable support such as activated carbon, barium sulfate, calcium carbonate, and the like. The amount of catalyst required for the hydrogenation will depend in part on the purity of the propadienyl material (II), but generally, an amount of catalyst between 2 and 15% by weight is sufficient in carrying out this reduction. As solvents there are conveniently employed benzene, toluene, hexane, ether, and other inert non-hydroxylic solvents. The temperature is not critical, and the hydrogenation is conveniently carried out at temperatures of from about 15–100° C. Positive hydrogen pressures of from about 10 to 100 p.s.i. are preferred but again higher or lower pressures may be employed without adverse effect. In carrying out the hydrogenation to obtain maximum yields of the desired propenyl compound, the hydrogenation is stopped when one mole of hydrogen per mole of the starting propadienyl compound has been taken up in order to avoid saturation of the remaining double bond. The hydrogen uptake is rapid and the theoretical amount of hydrogen is normally absorbed in from about one-half to 4 hours. In the reduction of the propadienyl moiety to the cis-olefin, hydrogenolysis of the half propargyl ester is also observed.

In the next step of the process of this invention, the cis-1-propenylphosphonic dichloride is hydrolyzed with water to the free cis-1-phosphonic acid. Hydrolysis of the chloride groups occurs very readily in the presence of water even at temperatures of about 0–10° C. The reaction is slightly exothermic so that the propenylphosphonic dichloride is added slowly over about one hour to water at 0–10° C. The hydrolysis can be accomplished by treating the organic solution containing cis-1-propenylphosphonic dichloride obtained from the previous reduction step with water. One or more equivalents of water may be added to the organic solution of the propenyl dichloride or the organic solution may be added to water. The cis-1-propenylphosphonic acid may be recovered from the hydrolysis reaction by techniques known in the art, such as removal of the water and organic solvent under reduced pressure.

It is also within the scope of this invention that the propadienylphosphonic dichloride be hydrolyzed to the free propadienylphosphonic acid and that this material be selectively reduced to the cis-1-propenylphosphonic acid. The hydrolysis is brought about in a similar fashion to that previously described for the hydrolysis of cis-propenylphosphonic dichloride to cis-propenylphosphonic acid. However, a selective reduction of the propadienyl acid is accomplished by conducting the hydrogenation in an aqueous solution at a basic pH, for example a pH equal or greater than 12. When propadienylphosphonic acid is treated with at least 10% excess of base over the amount needed to neutralize the two acid hydroxyl groups and is heated, the phosphonic acid salt isomerizes in situ to 1-propynylphosphonic acid disodium salt (IV):

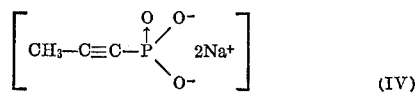

(IV)

The step of selectively reducing the propynyl acid to produce the propenylphosphonic acid is conveniently effected by hydrogenating the propynyl compound in the presence of a suitable hydrogenation catalyst such as a noble metal or Raney nickel catalyst. In carrying the hydrogenation to obtain maximum yields of the desired propenyl compound, the hydrogenation is stopped when one mole of hydrogen per mole of the starting propynyl compound has been taken up in order to avoid saturation of the unsaturated bond. Catalysts especially useful in this reduction are palladium or Raney nickel on a suitable support such as activated carbon, barium sulfate, calcium carbonate, and the like. The amount of catalyst required for the hydrogenation will depend on the purity of the propynyl compound being reduced, but generally, an amount of catalyst between about 2 and 10% by weight is sufficient in carrying out this selective reduction. The temperature is not critical, and the hydrogenation is conveniently carried out at a temperature of from about 15 to 50° C. Positive hydrogen pressures of from about 10 to 100 p.s.i. are preferred but again higher or lower pressures may be employed without adverse effect. The cis-1-propenylphosphonic acid may be recovered from the aqueous solution by techniques known in the art.

Although the processes of this invention have been described and illustrated with respect to formation of propenylphosphonic acid from propargyl alcohol, it should be understood that other β-γ acetylenic alcohols may be employed as starting material with the formation of the corresponding α:β-unsaturated cis-phonic acid. Examples of other starting materials that might be mentioned are 3-butyn-2-ol, 2-methyl-3-butyn-2-ol, and 3-methyl-4-pentyn-3-ol. Other phosphorus halides, for example phosphorus trifluoride or phosphorus tribromide, can also be employed in the practice of this invention.

The following examples are given for the purpose of illustration and not by way of limitation.

PREPARATION OF PROPADIENYLPHOSPHONIC DICHLORIDE

Example 1

A two liter Morton flask, provided with motor stirrer, immersion thermometer and condenser with drying tube at the top, is charged with 525 ml. of phosphorus trichloride (824 g., 6.0 moles) and heated in an oil bath to 74° C. With vigorous stirring, 11.3 ml. of propargyl alcohol (11.2 g., 0.20 mole) in a thin delivery tube passing through the condenser, is added subsurface as rapidly as possible (5–10 seconds) under positive pressure. Gaseous hydrogen chloride is evolved rapidly and is allowed to pass out of the system through the condenser. The intermediate (I), 2-propynylphosphorodichloridite, is formed rapidly and is rearranged thermally in situ to propadienylphosphonic dichloride (II) by bringing the solution to reflux (76° C.), and continuing at reflux for about 3 hours.

Excess phosphorus trichloride is removed under reduced pressure, and the residual oil is flushed with toluene several times to remove last traces of phosphorus trichloride. This affords 28.6 g. of product consisting of 92 parts of propadienylphosphonic dichloride and 8 parts of the half ester, 2-propynyl propadienylphosphonochloridate.

Pure propadienylphosphonic dichloride may be cleanly separated from the small amount of half ester by distillation at 36–40° C./0.1 mm.

Example 2

A reaction flask, fitted with motor stirrer, immersion thermometer, and condenser with drying tube, is charged with 52.5 ml. of phosphorus trichloride (0.6 mole) and heated in an oil bath to 60° C. With vigorous stirring 1.12 ml. of propargyl alcohol (0.02 mole) is added subsurface as rapidly as possible under positive pressure. Gaseous hydrogen chloride is evolved rapidly and is allowed to pass out of the system through the condenser. About 0.5 hr. after the addition, the solution is heated to reflux and is maintained at reflux for about 5 hours. Excess phosphorus trichloride is removed under reduced pressure and the residual oil is flushed with toluene to remove the last traces of phosphorus trichloride. This affords 2.91 grams of product consisting of 87 parts of propadienylphosphonic dichloride and 13 parts of the half ester, 2-propynyl propadienylphosphonochloridate.

Example 3

A reaction flask, fitted with motor stirrer, immersion thermometer, and condenser with drying tube, is charged with 17.5 ml. of phosphorus trichloride (0.2 mole) and heated in an oil bath to 60° C. With vigorous stirring 1.12 ml. of propargyl alcohol (0.02 mole) is added very slowly over a 15 minute period while the temperature is maintained at 60° C. When the addition is over, the solution is heated to reflux and maintained at reflux for 3 hours. The excess phosphorus trichloride is removed under reduced pressure and the residual oil flushed with toluene to remove the last traces of phosphorus trichloride. This affords 2.75 grams of product consisting of 72% propadienylphosphonic dichloride and 28% of by-product.

Example 4

A reaction flask, fitted with motor stirrer, immersion thermometer, and condenser with drying tube, is charged with 262.5 ml. of phosphorus trichloride (3 moles). With vigorous stirring 5.6 ml. of propargyl alcohol (0.1 mole) is added sub-surface as rapidly as possible under positive pressure at 25° C. The reaction is heated to reflux in about 10–15 minutes and maintained at reflux for 4 hours. Excess phosphorus trichloride is removed under reduced pressure and the residual oil is flushed with toluene to remove the last traces of phosphorus trichloride. This affords 9.4 grams of product consisting of 65% propadienylphosphonic dichloride and 35% 2-propynyl propadienylphosphonochloridate.

Example 5

A 1-liter Morton flask fitted with motor stirrer, immersion thermometer, condenser with drying tube, and an overflow take-off device is charged with 200 ml. of anhydrous toluene and heated to 95° C. A solution of 3.08 moles of phosphorus trichloride in 1 liter of toluene is added at a rate of 4.60 ml. per minute above the surface of the toluene. A solution of 1.30 moles of propargyl alcohol in 1 liter of toluene is added at a rate of 3.72 ml. per minute subsurface at the periphery of the stirrer blade. The feed rates are set for a residence time of 1.3 hours and the temperature is maintained at 95° C.; a steady state condition is achieved after six hours of operation. The volume for the reaction is set at 663 ml. and is controlled by means of an overflow. The overflow product is continuously removed at a rate of 8.32 ml. per minute. After the solvent is removed by evaporation, the product is analyzed by NMR and is found to contain 90 mole percent of propadienylphosphonic dichloride and 10 mole percent of by-product, 2-propynyl propadienylphosphonochloridate.

In accordance with the above procedure but maintaining the temperature at 85° C. or 90° C., the same product ratio is obtained. When xylene is employed as the solvent and the reaction temperature is 110° C., the product obtained consists of 80 mole percent of propadienylphosphonic dichloride and 20 mole percent of 2-propynyl propadienylphosphonochloridate.

In accordance with the procedure of Example 5, propadienylphosphonic dichloride is prepared employing various molar ratios of phosphorus trichloride to propargyl alcohol:

| Example | Molar equivalent phosphorus trichloride: propargyl alcohol | Product mole percent propadienylphosphonic dichloride: by-product |
|---|---|---|
| 6 | 1.2:1 | 75:25 |
| 7 | 2:1 | 90:10 |
| 8 | 3:1 | 90:10 |
| 9 | 9:1 | 83:17 |
| 10 [1] | 38:1 | 75:25 |

[1] Reaction is run at 90° C.

PREPARATION OF CIS-PROPENYLPHOSPHONIC DICHLORIDE

Example 11

Propadienylphosphonic dichloride (23.5 g., 0.15 mole) in 135 ml. anhydrous benzene is added to 2.35 g. of 5% Pd/C pre-reduced in 100 ml. dry benzene. The mixture is shaken at room temperature under a constant 15 p.s.i. of H$_2$ until hydrogen uptake ceases (4 hours). After filtration of the catalyst, the solvent is removed to afford cis-propenylphosphonic dichloride in high yield and having a purity of 95%; B.P. 27–29°/0.2 mm.

In accordance with the above procedure, but using palladium on barium sulfate or Raney nickel as the catalyst, cis-propenylphosphonic dichloride is obtained in high yield and purity.

PREPARATION OF CIS-PROPENYLPHOSPHONIC ACID

Example 12

Cis-propenylphosphonic dichloride (15.7 g., 0.10 mole) is added over a 0.5 hr. period to 50 ml. of stirred water, kept at 0–10° C. When the addition is complete, the solution is stirred at ambient temperature for 1.0 hour and then the water is removed on the rotovac. The residual oil is flushed with benzene (2× 25 ml.), then dried further in vacuo at 50° C. to afford 12.2 g. of crystalline cis-propenylphosphonic acid, M.P. 54–57° C., of 95% purity. The monobenzylammonium salt has M.P. 155–157° C.

PREPARATION OF PROPADIENYLPHOSPHONIC ACID

Example 13

Propadienylphosphonic dichloride (90.0 g., 0.573 mole) is added over a one hour period to 450 ml. of stirred water, kept at 0–10° C. When the addition is complete, the solution is stirred at ambient temperature for one hour more and then the water is removed on the rotovac. The residual oil is flushed with benzene (2× 100 ml.), then dried further in vacuo at 45° C. to give 68.0 g. (99% yield) of pure propadienylphosphonic acid. The monobenzylammonium salt has M.P. 181–182° C.

PREPARATION OF CIS-PROPENYLPHOSPHONIC ACID

Example 14

To propadienylphosphonic acid (24.0 g., 0.20 mole) is added, with stirring, 88 ml. (0.44 mole) of 5 N-sodium hydroxide. The solution is heated in a 95° C. oil bath for 0.5 hr. to complete the isomerization to 1-propynylphosphonic acid disodium salt. The solution is then diluted with water to a volume of 140 ml. (pH=12.9) and combined with 1.20 g. of 5% Pd/C pre-reduced in 100 ml. of water. The mixture is shaken at a constant 15 p.s.i. of hydrogen until the theoretical amount is taken up (3 hr.), and then the hydrogenation is stopped. The catalyst is removed by filtration and the filtrate, containing cis-propenylphosphonic acid disodium salt is passed through a column containing excess 1R–120 resin (a "gel" type amberlite polysulfonated styrene-DVB resin obtained from Rohm and Haas Co.) on the acid cycle. The acidic eluant is concentrated to an oil which is dried by first flushing with benzene (3× 200 ml.), and then in vacuo at 45° C. to afford 25.0 g. of crystalline cis-propenylphosphonic acid having a purity of 96%.

What is claimed is:
1. A continuous process for preparing propadienylphosphonic dichloride which comprises adding simultaneously 3–10 molar equivalents of phosphorous trichloride per mole of propargyl alcohol to an inert solvent at a temperature of from 85–110° C. in the absence of base and removing the propadienylphosphonic dichloride as it is formed.

2. A continuous process for preparing propadienylphosphonic dichloride which comprises adding simultaneously 1.5–30 molar equivalents of phosphorous trichloride per mole of propargyl alcohol to an inert solvent at a temperature of from 85–110° C. in the absence of base and removing the propadienylphosphoric dichloride as it is formed.

3. The process of claim 1 wherein the inert hydrocarbon solvent is selected from the group consisting of toluene and xylene.

References Cited
UNITED STATES PATENTS 2,500,022   3/1950   Brown _____ 260—461

OTHER REFERENCES

Kosolapoff: Organophosphorus Chem., p. 64.
Roberts and Cassario: Basic Princ. of Org. Chem., p. 277.
Kosolapoff, Organo Phosphorous Compds. (1950), pp. 180–184.

LORRAINE H. WEINBERGER, Primary Examiner

R. D. KELLY, Assistant Examiner

U.S. Cl. X.R.

260—502.4 R